2 Sheets—Sheet 1.

W. B. DUNNING.

Base Burning Stove for Steam-Heating Boiler.

No. 8,569. Reissued Feb. 4, 1879.

Witnesses:

Clarence Poole

G. M. Seely

Inventor:

William B. Dunning by Ellis Spear

Atty

2 Sheets—Sheet 2.

W. B. DUNNING.

Base Burning Stove for Steam-Heating Boiler.

No. 8,569. Reissued Feb. 4, 1879.

WITNESSES:
Clarence Poole
L. M. Duly

INVENTOR:
William B. Dunning
by Ellis Spear
Atty

UNITED STATES PATENT OFFICE.

WILLIAM B. DUNNING, OF GENEVA, NEW YORK.

IMPROVEMENT IN BASE-BURNING STOVES FOR STEAM-HEATING BOILERS.

Specification forming part of Letters Patent No. 101,718, dated April 12, 1870; Reissue No. 8,569, dated February 4, 1879; application filed December 30, 1878.

*To all whom it may concern:*

Be it known that I, WILLIAM B. DUNNING, of Geneva, in the county of Ontario and State of New York, have invented a new and useful Improvement in Base-Burning Stoves for Steam-Heating Boilers; and I hereby declare that the following is a full, clear, and exact description of the same.

My invention relates to steam-heating apparatus for buildings, particularly of that class in which the magazine or fuel-reservoir is located within an annular boiler.

It has for its object to obtain the compactness of form arising out of the location of the magazine within the annular boiler, together with proper draft and the exposure of the largest possible amount of surface of the boiler to the action of the products of combustion.

In ordinary steam-heating boilers it is necessary to frequently replenish the fuel upon the fire, which operation generally causes the steam to run down, or by neglect to replenish the fuel at the proper time steam ceases to be generated. Vents in all the ventilators must then be opened to allow the steam, as it is again raised, to enter and drive out the air—a troublesome process, especially in large buildings.

In order conveniently to adapt a fuel-reservoir to a steam-generator, by which this difficulty can be avoided, I have constructed the boiler and combined the magazine therewith in the manner hereinafter described.

Figure 1:
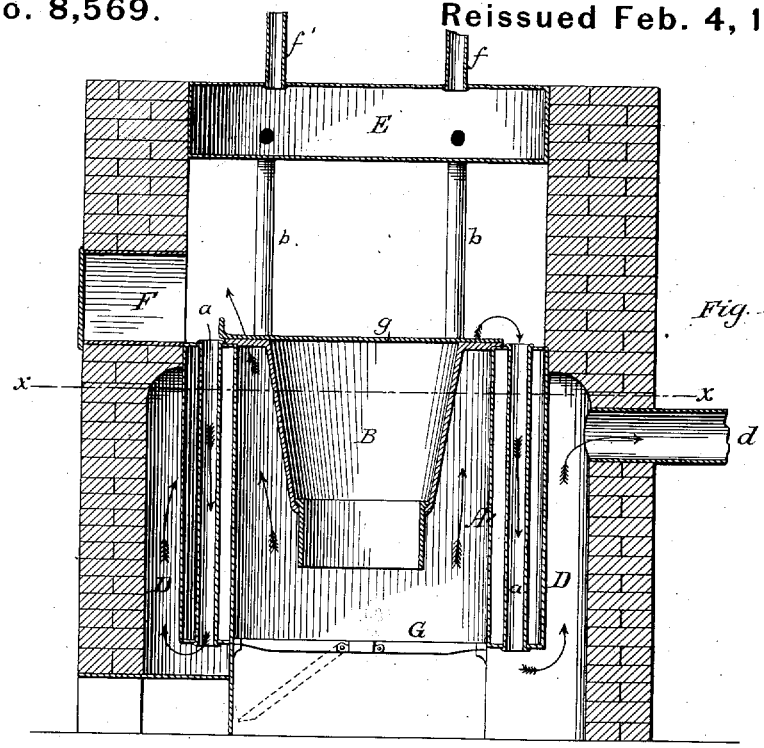
Figure 2:
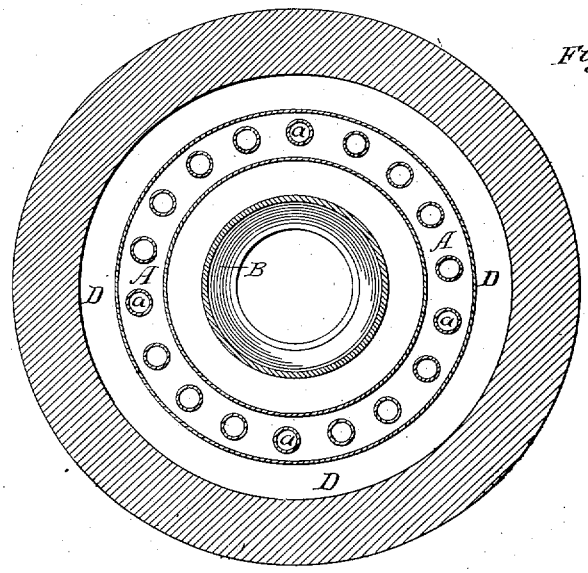
Figure 3:
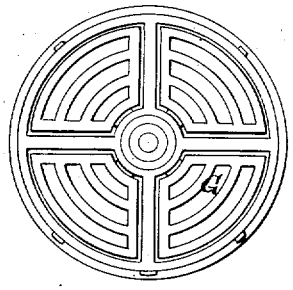
Figure 4:
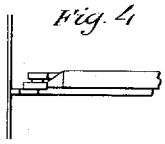
Figure 5:
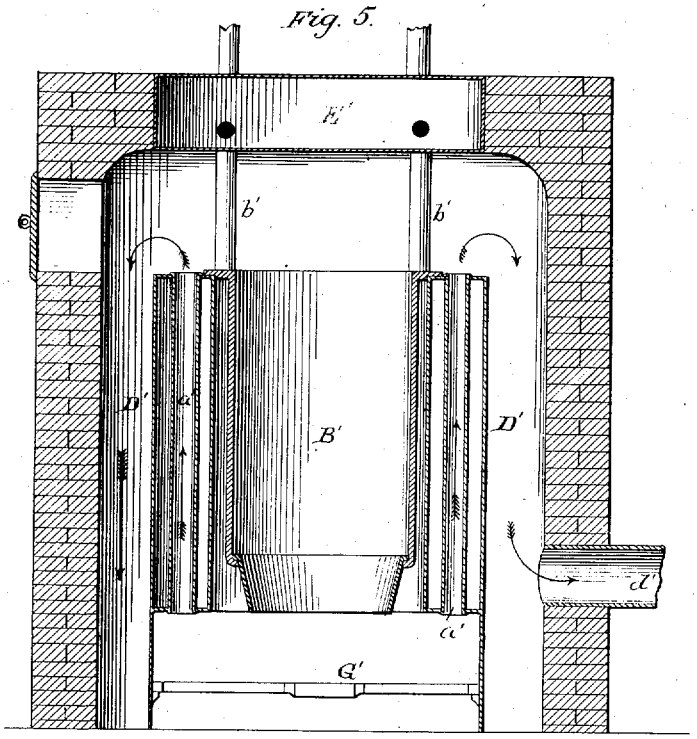

In the drawings, Figure 1 is a vertical central section of an apparatus embodying my invention. Fig. 2 is a plan view below the dotted line *x* in Fig. 1. Fig. 3 is a plan view of the fire-grate. Fig. 4 is a section of a portion of the same. Fig. 5 is a vertical section of a modification of my invention.

In Fig. 1 of the drawings the fuel-reservoir is represented at B, located centrally within the annular water-chamber A, and resting upon the upper edge of said water chamber or boiler by means of suitable lugs. This reservoir extends down into the furnace to a proper point above the grate G.

The water-chamber A is provided with vertical fire-tubes *a*. (Shown in longitudinal section in Fig. 1 and in the transverse section in Fig. 2.)

It will be observed in the form shown in Fig. 1 that an annular space is left between the outer surface of the magazine and the inner surface of the water chamber or boiler, through which the products of combustion can escape into the space above the said water chamber or boiler. The products of combustion pass thence down the vertical flues in the water chamber or boiler, through said chamber, and thence pass into the annular smoke-chamber D, formed by surrounding the shell of the boiler with a suitable projecting wall or jacket.

A steam-drum, E, is shown in Fig. 1, located above the top of the reservoir, leaving a space between it and the said reservoir, which may serve as a combustion-chamber for the smoke and gases.

Communication is effected between the steam-drum and the water chamber or boiler A by means of pipes *b*. A steam-pipe, *f*, and return water-pipe *f'* are shown in Fig. 1. Attached to the steam-drum in the usual manner are safety-valve and other necessary appliances to be used in connection therewith.

It is advisable to connect pipes *b* to the drum somewhat above the bottom of the latter, as shown in Fig. 1, whereby the bottom plate is kept constantly covered with water of condensation returning through the pipe *f'*. The bottom is thereby prevented from being burned by heat from the furnace.

The products of combustion take the course indicated by the arrows in Fig. 1, passing between the reservoir and the interior of the shell A, returning through the flues *a*, and ascending upon the outside of the shell A to the escape *d*.

It will be observed that by the above-described arrangement of heating-surfaces I expose both the inner and outer periphery of the shell A, as well as the lower side of the drum E, and the inner surface of the flues *a* to the action of the heat, thus economizing the heat to the greatest extent.

The fuel-reservoir B is covered by the slide *g*, which is drawn out into the doorway F when the reservoir is being filled. Those of the flues

*a* which are opposite the doorway F are covered by the slide when thus drawn out. The heat is thus prevented from rising from said flues, and the fuel from falling through the same into the chamber D. The lower portion of the reservoir B is made detachable, for the purpose of renewing it when burned.

In Fig. 5 I have shown another form of heater, differing, however, but slightly from that shown in Fig. 1, in which the products of combustion pass directly through the flues *a'* and return through the chamber D' to the pipe *d'*. The heat is not so fully economized as in the first-described arrangement, but it may be preferable in many locations on account of requiring a less powerful draft.

The advantages of my invention are, that the heat is very nearly all utilized by passing over the extended surfaces of the generator. Steam is kept up constantly by filling the fuel-reservoir at proper intervals, such operation occasioning no fluctuation in the steam-supply. All the parts of the apparatus are simple in construction and properly protected from destruction by heat. The position of the grate G is shown in the drawings. Its form does not differ materially from those in common use. It may be desirable to hinge each bar of the grate separately.

I am aware that an annular boiler with a central fuel-reservoir inseparably connected with or forming a part of said boiler, and without an annular space between it and said boiler, is not new; and I am also aware that such an annular boiler with interior fuel-reservoir, and with flues and smoke-passages wholly within said boiler, is not new.

What I claim as my invention, and desire to secure by Letters Patent, is—

1. In a steam-heating apparatus, an annular water chamber or boiler and a central fuel-reservoir arranged within the said annular boiler and resting upon the top thereof, with an annular space between the magazine and boiler, all as set forth.

2. The combination, in a steam-heating apparatus, of an annular boiler, a centrally-arranged fuel-reservoir, vertical pipes for the passage of the products of combustion, and a smoke-chamber wholly exterior to said boiler, as set forth.

3. The combination of an annular boiler, an interior centrally-located reservoir, an annular space between the said reservoir and boiler for the passage of the products of combustion, smoke-flues in the annular boiler, and an exterior smoke-chamber, as set forth.

4. The combination of a central magazine resting at its top upon an annular boiler, smoke-passages between said magazine and boiler, and descending flues for the products of combustion, as set forth.

5. The combination of an annular boiler, a central magazine, ascending and descending flues, and a steam-drum connected with said boiler, as set forth.

6. The combination of the central magazine B, the annular boiler A, the annular smoke-passage between the reservoir and the boiler, the descending flues *a*, and the annular smoke-chamber D, the parts being constructed and arranged as set forth.

WILLIAM B. DUNNING.

Witnesses:
S. SOUTHWORTH,
CHAS. H. RUSH.